United States Patent
Krupinski et al.

(10) Patent No.: US 6,433,092 B2
(45) Date of Patent: *Aug. 13, 2002

(54) TETRAFUNCTIONAL INITIATOR

(75) Inventors: Steven M. Krupinski, Pittsburgh; Robert J. Gorka, Beaver Falls, both of PA (US)

(73) Assignee: Nova Chemicals Inc., Moon Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,230

(22) Filed: Mar. 6, 2001

Related U.S. Application Data

(60) Continuation-in-part of application No. 09/678,910, filed on Oct. 4, 2000, which is a division of application No. 09/553,593, filed on Apr. 20, 2000, now Pat. No. 6,166,099.

(51) Int. Cl.$^7$ .............. C08F 8/00; C08F 4/36; C08L 45/00; C08L 9/00
(52) U.S. Cl. ........... 525/192; 525/211; 525/232; 526/230.5; 526/232.3; 526/346
(58) Field of Search .............. 526/230.5, 346, 526/232.3; 525/192, 211, 232

(56) References Cited

U.S. PATENT DOCUMENTS

| | | |
|---|---|---|
| 2,848,427 A | 8/1958 | Rubens |
| 2,848,428 A | 8/1958 | Rubens |
| 3,960,784 A | 6/1976 | Rubens |
| 4,424,287 A | 1/1984 | Johnson et al. |
| 5,250,577 A | 10/1993 | Welsh |
| 5,266,602 A | 11/1993 | Walter et al. |
| 5,576,094 A | 11/1996 | Callens et al. |
| 5,760,149 A | 6/1998 | Sanchez et al. |
| 5,830,924 A | 11/1998 | Suh et al. |

FOREIGN PATENT DOCUMENTS

AU 529339 11/1979

OTHER PUBLICATIONS

L.C. Rubens, Some Effects of Crosslinking Upon the Foaming Behavior of Heat Plastified Polystyrene, Journal of Cellular Plastics, Apr., 1965, pp. 311–320.

*Primary Examiner*—Morton Foelak
(74) *Attorney, Agent, or Firm*—Kenneth H. Johnson

(57) ABSTRACT

The melt of polyvinyl aromatic polymers comprising from 10 to 45 weight % of star branched polymer prepared using a combination of thermal and tetra functional peroxide initiation has an improved melt strength permitting better foam formation for extrusion foam blown with conventional blowing agents and inert gases including $CO_2$ and an improved tensile strength for oriented polystyrene (OPS) articles, e.g. blown film or extruded sheet.

10 Claims, No Drawings

TETRAFUNCTIONAL INITIATOR

This application is a continuation-in-part of U.S. Ser. No. 09/678,910 filed on Oct. 4, 2000 which is a division of U.S. Ser. No. 09/553,593 filed on Apr. 20, 2000 which issued into U.S. Pat. No. 6,166,099 on Dec. 26, 2000.

FIELD OF THE INVENTION

The present invention relates to polymeric foams and oriented articles, e.g. blown film or extruded sheet and a polymer composition used in the foams and oriented articles. More particularly the present invention relates to foams and oriented articles prepared from a polymer composition comprising a vinyl aromatic polymer that comprise from 10 to 45 weight % of a star branched vinyl aromatic polymer.

BACKGROUND OF THE INVENTION

Monovinyl and vinyl aromatic-based resins, such as for example, styrene-based resins, i.e. polystyrene-based resins, are well known and widely employed for producing foams and oriented articles for use in food packaging, toys, small appliances, compact disc and audio/video cassette casings. Processes used to manufacture such articles involve extrusion, fast injection molding, blow molding, and thermoforming applications.

In the manufacture of extrusion foam there are competing factors to balance. One needs to consider the viscosity or melt flow rate of the polymer as it impacts on the extruder output and the melt strength of the polymer, and particularly of the foaming mass as it leaves the extruder as this impacts on the bubble stability or the foam stability. If one makes a very low viscosity polymer it will flow through the extruder easily. However a low viscosity polymer tends to have a low melt strength and the resulting foam tends to have a lower stability. Accordingly, there is a tendency for foams of low viscosity to collapse upon extrusion or shortly after leaving the extruder.

It has been known for some time that the melt strength of a polymer may be improved by lightly cross-linking the polymer. The paper "Some Effects of Crosslinking Upon the Foaming Behavior of Heat Plastified Polystyrene", L. C. Rubens *Journal of Cellular Plastics*, April 1965, 311–320 discloses that polystyrene, containing small amounts (about 0.03 weight %) of divinyl benzene, may be foamed with $CO_2$ and the polymer has good foam stability and good foam volume. This technology is also the subject matter of U.S. Pat. Nos. 2,848,427 and 2,848,428 issued Aug. 19, 1958 to Louis C. Rubens assigned to The Dow Chemical Company. The technology comprised forming a cross-linked polystyrene polymer then impregnating it in solid state with $CO_2$ then releasing the pressure and letting the polymer expand. This technology was not strongly relevant to extrusion foam techniques.

The cross linking technology was further applied in U.S. Pat. No. 3,960,784 issued Jun. 1, 1976 to Louis C. Rubens assigned to The Dow Chemical Company. This patent teaches concurrent impregnation of a polymer with a blowing agent and a cross-linking agent. The polystyrene is prepared at temperatures from about 60° C. to 120° C., preferably from about 70° C. to 100° C. (Column 3 lines 25–26). These temperature ranges are indicative of suspension polymerization and concurrent or post polymerization impregnation with the blowing agent and cross linking agent (see Example 3) although the polymer could be molded into thin sheets for the impregnation step. This reference does not teach extrusion foam.

While divinyl benzene is useful in suspension polymerization it tends to produce gels in bulk or solution polymerization. In a bulk or solution polymerization the use of tetra functional initiators significantly reduces gels. Typically no or very low levels (e.g. less than 0.5 weight %, more generally less than 0.1 weight %) of gels (i.e. insoluble polymer in typical solvents) are desired.

With the introduction of the Montreal protocol on reducing the use of CFC's and HCFC's and regulations regarding the permissible discharge of volatile organic compounds (VOC'S), there was increased pressure on the polymer foam industry to move to other blowing agents such as $CO_2$ or $N_2$. Representative of this type of art is Monsanto's Australian Patent 529339 allowed Mar. 17, 1983. The patent teaches the formation of a foam by extruding polystyrene and injecting $CO_2$ into the extruder. Interestingly there is no mention of cross linking agents or branched polystyrene in the patent. U.S. Pat. No. 5,250,577 issued Oct. 5, 1993 to Gary C. Welsh is similar as it pertains to extrusion foaming polystyrene in an extrusion process using $CO_2$ as the sole blowing agent. Again there is no reference in U.S. Pat. No. 5,250,577 to the use of cross-linking agents.

At about this time U.S. Pat. No. 5,266,602 was issued to Walter et al. and assigned to BASF. This patent teaches foaming a branched polystyrene. The foaming agent is conventional (e.g. $C_{4-6}$ alkanes). The polymer is prepared in the presence of a peroxide initiator other than a benzoyl compound and a chain transfer agent such as a mercaptan (e.g. t-dodecyl mercaptan) and a "branching agent". The branching agent contains a second unsaturation as a point for the polymer to branch. Suitable agents include divinyl benzene, butadiene and isoprene. These types of branching agents would not produce the star branched polymers referred to herein. The actual polymerization process appears to be a suspension process. Additionally there is no reference in the disclosure to blowing the polystyrene with anything other than conventional alkane blowing agents.

U.S. Pat. No. 5,576,094 was issued on Nov. 19, 1996 to Callens et al. and assigned to BASF. This patent teaches extruding slab foamed polystyrene blown with $CO_2$ or a mixture of $CO_2$ and $C_{1-6}$ alcohols or ethers of $C_{1-4}$ alkyl alkoxy compounds. The polystyrene is a branched polystyrene preferably having at least 50%, more preferably 60% of the polymer being a star branched styrene butadiene block polymer. The polymer has a VICAT softening temperature not greater than 100° C. This teaches against the subject matter of the present invention. Additionally the polymer has a melt index MVI 200/5 of at least 5 mL/10 minutes.

U.S. Pat. No. 5,830,924 was issued on Nov. 3, 1998 to Suh et al. and assigned to The Dow Chemical Company. This patent claims a process for extruding a closed cell foam using $CO_2$ or a mixture of $CO_2$, conventional alkane blowing agents and a polystyrene in which from 50 to 100 weight % of the polystyrene is star branched (i.e. branched). This teaches away from the subject matter of the present invention that requires a different type of polymer and lower weight % of star branched vinyl aromatic polymer.

U.S. Pat. No. 5,760,149 was issued on Jun. 2, 1998 to Sanchez et al. This patent discloses tetra functional (monoperoxycarbonate) compounds that are useful as initiators for olefin monomers including styrene. The patent also teaches a process for polymerizing polystyrene. However, there is no teaching in the patent of foaming the resulting polymer using extrusion techniques.

Oriented film or sheet may also be made from styrenic polymers. Examples of oriented articles, e.g. films, sheets, or tubes, are disclosed in U.S. Pat. Nos. 4,386,125; 5,322,664; 5,756,577; and 6,107,411.

U.S. Pat. No. 4,386,125 was issued on May 31, 1983 to Shiraki et al. and assigned to Asahi Kasei Kogyo Kabushika Kaisha. This patent discloses a transparent film, sheet, or tube of a block copolymer or a block copolymer composition having an excellent low-temperature shrinkage of not less than 15% in terms of a heat shrinkage factor at 80 ° C. in at least one direction and good mechanical properties. The block copolymer has a melt flow of 0.001 through 70 grams/10 min. and comprises an aromatic vinyl hydrocarbon polymer block having a number average molecular weight of 10,000 through 70,000 and a polymer block composed mainly of a conjugated diene, and a residual group of a coupling agent or a polyfunctional initiator such as an organo polylithium compound.

U.S. Pat. No. 5,322,644 discloses a method and apparatus for making a clear single layer polystyrene non-foam film for use as a label on containers. A blend of general purpose polystyrene and styrene-butadiene or styrene butyl acrylate is extruded from an annular extruder die orifice to form a frustoconical tube which is stretched before cooling air is applied to form a clear film that has machine direction orientation and cross direction orientation that can be used as a shrinkable label on containers. During the extrusion stage, the polystyrene has flow rates of about 8–10 (grams/ 10 min. condition G) and VICAT softening temperatures of about 220 to 225° F.

U.S. Pat. No. 5,756,577 was issued on May 26, 1998 to Villarreal et al. and assigned to Group Cydsa, S.A. de C.V. This patent claims a heat shrinkable thermoplastic film or sheet comprising a block copolymer of styrene-butadiene, wherein the amount of polymerized butadiene units in the copolymer constitutes from about 1 to about 50 weight % of the composition. The film or sheet has a tensile strength of about 372 kg/cm$^2$ in the machine direction and about 255 kg/cm$^2$ in the transverse direction, and a shrinking value at 130° C. of about 44% for the machine direction and about 0% for the transverse direction.

U.S. Pat. No. 6,107,411 was issued on Aug. 22, 2000 to Toya et al. and assigned to Denki Kagaku Kogyo Kabushiki Kaisha. This patent disclosed a block copolymer consisting essentially of a vinyl aromatic hydrocarbon and a conjugated diene, which is excellent in transparency, stiffness, impact resistance, and spontaneous shrinkage resistance; a composition comprising such a block copolymer, and heat shrinkable films prepared by orienting them. The block copolymer satisfies certain conditions such as a specific weight ratio of the vinyl aromatic hydrocarbon to the conjugated diene in the block copolymer, a specific molecular weight of the block copolymer, a specific storage modulus, a specific block proportion of the vinyl aromatic hydrocarbon polymer, and a specific proportion of chains consisting of repeating units of the vinyl aromatic hydrocarbon.

A process for making an extruded oriented sheet is well known in the art and is discussed further herein below. It is also known to those skilled in the art that the control of the film or sheet thickness, the temperature of the film, and the draw ratios are important parameters that define the film properties. Generally, materials having high melt strength and retaining their orientation are considered better film or sheet forming materials than those having lower melt strength and not retaining their orientations.

It is also known in the art, that generally, polystyrene materials that contain branched structures possess higher melt strengths and have better processing characteristics than polystyrene materials that possess linear polymeric structures.

The above U.S. Pat. No. 5,830,924 assigned to The Dow Chemical Company discloses an example of a polystyrene for an extruded closed cell foam in which from 50 to 100 weight % of the polystyrene is branched.

A further example of a polystyrene material containing branched structures well suited for the preparation of blow molded articles, films, extruded foam, refrigerator liners, thermoformed articles and injection molded articles is disclosed in U.S. Pat. No. 6,093,781 issuing on Jul. 25, 2000 to Demirors, etal and assigned to The Dow Chemical Company. This patent also teaches away from the subject matter of the present invention that requires a different type of polymer, which, in turn requires a different type and weight % initiator, and a lower weight % of a branched vinyl aromatic polymer.

The present invention seeks to provide a novel process for extrusion foaming of styrenic polymers in which the styrenic polymer comprises less than 50 weight % of branched styrenic polymer.

The present invention also seeks to provide for an oriented polystyrene article of styrenic polymers in which the styrenic polymer comprises about 50 weight % or less of branched styrenic polymer whereby the polymer is prepared by solution or bulk polymerization in the presence of from 0.01 to 0.1 weight % of a tetra functional peroxide initiator.

SUMMARY OF THE INVENTION

The present invention provides a closed cell foam comprising from $C_{8-12}$ vinyl aromatic polymer comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising 10 to 45 weight % of a star branched polymer and having a VICAT softening temperature not less than 100° C.

In a further embodiment the present invention provides a process for preparing the above closed cell foam comprising injection into a molten mass of $C_{8-12}$ vinyl aromatic polymer comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymers are grafted onto from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said polymer comprising 10 to 45 weight % of a star branched polymer and having a VICAT softening temperature not less than 100° C.; at a temperature from 140 to 235° C. and a pressure from 1500 to 3500 psi from 2 to 15 weight % of one or more blowing agents selected from the group consisting of $C_{4-6}$ alkanes, CFCs, HCFCs, HFCs, $CO_2$ and $N_2$ and maintaining said $C_{8-12}$ vinyl aromatic polymer in a molten state and thoroughly mixing said blowing agent with said polymer and extruding said mixture of blowing agent and polymer.

The present invention also provides a process for polymerizing a vinyl aromatic monomer comprising from 5 to 45 weight % of star branched vinyl aromatic polymer, comprising feeding a mixture comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, and from 0.01 to 0.1 weight % of a tetrafunctional peroxide initiator of the formula:

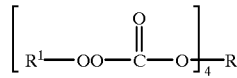

wherein $R^1$ is selected from the group consisting of $C_{4-6}$ t-alkyl radicals; and R is a neopentyl group, in the absence of a cross linking agent to a series of two or more continuous stirred tank reactors, to provide a relatively low temperature initial reaction zone at a temperature from 100 to 130° C. and a relatively higher temperature subsequent reaction zone at a temperature from 130 to 160° C. and maintaining a ratio of residence time in said relatively lower temperature reaction zone to said relatively higher temperature reaction zone from 1:1 to 3:1 and recovering the resulting polymer, preferably, through devolatilization of unreacted monomers.

The present invention also provides a polymer composition comprising $C_{8-12}$ vinyl aromatic polymer prepared by solution or bulk polymerization in the presence of from 0.01 to 0.1 weight % of a tetra functional peroxide initiator of the formula:

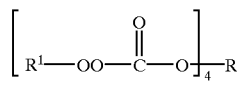

wherein $R^1$ is selected from the group consisting of $C_{4-6}$ t-alkyl radicals and R is a neopentyl group, in the absence of a cross linking agent. comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising about 10 to about 50 weight % of a star branched polymer. The vinyl aromatic polymer preferably has a VICAT softening temperature not less than 100° C.

The present invention also provides an oriented polystyrene article, e.g. film or sheet comprising from $C_{8-12}$ vinyl aromatic polymer prepared by solution or bulk polymerization in the presence of from 0.01 to 0.1 weight % of a tetra functional peroxide initiator of the formula:

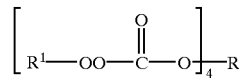

wherein $R^1$ is selected from the group consisting of $C_{4-6}$ t-alkyl radicals and R is a neopentyl group, in the absence of a cross linking agent, comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymer may be grafted onto or occluded within from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile] said vinyl aromatic polymer comprising 10 to 45 weight % of a star branched polymer. The vinyl aromatic polymer preferably has a VICAT softening temperature of not less than 100° C.

In a further embodiment the present invention provides a process for preparing the above oriented polystyrene article comprising injection into a molten mass of $C_{8-12}$ vinyl aromatic polymer prepared by solution or bulk polymerization in the presence of from 0.01 to 0.1 weight % of a tetra functional peroxide initiator of the formula:

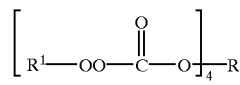

wherein $R^1$ is selected from the group consisting of $C_{4-6}$ t-alkyl radicals and R is a neopentyl group, in the absence of a cross linking agent. comprising:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile;

which polymers are grafted onto from 0 to 12 weight % of one or more rubbery polymers selected from the group consisting of:

iii) co- and homopolymers of $C_{4-5}$ conjugated diolefins; and iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising about 10 to about 50 weight % of a star branched polymer and a VICAT softening temperature not less than 100° C.;

maintaining said $C_{8-12}$ vinyl aromatic polymer in molten state and thoroughly mixing said polymer and extruding said polymer.

It is therefore an objective of the present invention to provide a polymer composition comprising a star branched polymer using a tetra-functional peroxide initiator for use in extrusion foams with improved melt strength compared to a polymer composition comprising a linear polymer.

It is a further objective of the present invention to provide a novel polymer composition comprising a star branched polymer using a tetra-functional peroxide initiator and its use in oriented articles with improved melt strength and/or tensile properties compared to a polymer composition comprising a linear polymer.

BEST MODE

As used in this specification "star branched" polymer means having multiple, preferably at least 3, most preferably 4, branches eminating from a common node.

Extrusion Foams:

The styrenic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably the vinyl aromatic monomer is styrene.

The styrenic polymer may be a copolymer comprising from 60 to 100 weight % of one or more $C_{8-12}$ vinyl aromatic monomers; and from 0 to 40 weight % of one or more monomers selected from the group consisting of $C_{1-4}$ alkyl esters of acrylic or methacrylic acid and acrylonitrile and methacrylonitrile. Suitable esters of acrylic and methacrylic acid include methyl acrylate, ethyl acyrlate, butyl acrylate, methyl methacrylate, ethyl methacrylate, butyl methacrylate, maleic anhydride, and fumaronitrile.

In a further embodiment of the present invention, the polymer for both extrusion foams and oriented articles may be rubber modified. That is, the polymer may be grafted onto or occluded within from 0 to 12 weight % of one or more rubbery polymers selected from the group consisting of:

i) co- and homopolymers of $C_{4-5}$ conjugated diolefins; and ii) copolymers comprising from 60 to 85 weight % of one or more $C_{4-5}$ conjugated diolefins and from 15 to 40 weight % of a monomer selected from the group consisting of acrylonitrile and methacrylonitrile.

The rubbery polymer may be selected from a number of types of polymers. The rubbery polymer may comprise from 40 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-5}$ conjugated diolefins. Such polymers are known as the styrene butadiene rubbers (SBR). The rubber may be prepared by a number of methods, preferably by emulsion polymerization. This process is well known to those skilled in the art and described for example in Rubber Technology, Second Edition, edited by Maurice Morton, Robert E. Krieger Publishing Company Malabar, Florida, 1973, reprint 1981—sponsored by the Rubber Division of the American Chemical Society.

The rubbery polymer may be a nitrile rubber comprising from 15 to 40 weight % of one or more monomers selected from the group consisting of acrylonitrile and methacrylonitrile, preferably acrylonitrile, and from 85 to 60 weight % of one or more $C_{4-6}$ conjugated diolefins. The polymers may be prepared by a number of methods, preferably by emulsion polymerization or anionic, i.e. K-resin or Kraton process. These processes are well known to those skilled in the art and the former is described for example in the aforementioned reference.

The rubber may be a co- or homopolymer of one or more $C_{4-6}$ conjugated diolefins such as butadiene (1,3-butadiene) or isoprene, preferably butadiene. The polybutadiene may have a molecular weight (Mw) from about 260,000 to 300,000, preferably from about 270,000 to 280,000. Polybutadiene has a steric configuration. The polymer may have a cis configuration ranging from about 50% up to 99%. Some commercially polymers have a cis content of about 55% such as TAKTENE® 550 (trademark of Bayer AG) or DIENE® 55 (trademark of Firestone). Some commercially available butadiene has a cis configuration from about 60 to 80% such as Firestone's DIENE® 570. Some high cis-butadiene rubbers may have a cis configuration of 95% or greater, preferably greater than 98% (TAKTENE® 1202).

If present, preferably the rubber is present in an amount from about 3 to 10% weight based on the total weight of the composition fed to the reactor (i.e. monomers and rubber). Polybutadiene is a particularly useful rubber.

The process for making HIPS (high impact polystyrene) is well known to those skilled in the art. The rubber is "dissolved" in the styrene monomer (actually the rubber is infinitely swollen with the monomer). The resulting "solution" is fed to a reactor and polymerized typically under shear. When the degree of polymerization is about equal to the weight % of rubber in the system it inverts (e.g. the styrene/styrene polymer phase becomes continuous and the rubber phase becomes discontinuous. After phase inversion the polymer is finished in a manner essentially similar to that for finishing polystyrene.

The polymer is prepared using conventional bulk, solution, or suspension polymerization techniques. However, there is added to the first reactor (i.e. the lower temperature reactor) from about 0.01 to 0.1 weight % (100 to 1000 ppm) of a tetrafunctional peroxide initiator of the formula:

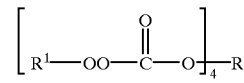

wherein $R^1$ is selected from the group consisting of $C_{4-6}$ t-alkyl radicals and R is a neopentyl group. The reaction is conducted in the absence of a cross linking agent. Preferably the tetrafunctional peroxide is present in the feed to the first reactor (i.e. the lower temperature reactor) in an amount from about 200 to 400 ppm (0.02 to 0.04 weight %), most preferably from 250 to 350 ppm (0.025 to 0.035 weight %).

Suitable tetrafunctional peroxide initiators include initiators selected from the group consisting of tetrakis-(t- amylperoxycarbonyloxymethyl) methane, tetrakis-(t-butylperoxycarbonyloxymethyl) methane, 1,2,3,4-tetrakis (t-amylperoxycarbonyloxy) butane and the tetrakis (t-$C_{4-6}$ alkyl monoperoxycarbonates). A particularly useful initiator is the compound of the above formula wherein R is a nenopentyl group and $R^1$ is a tertiary amyl or tertiary butyl radical.

Typically in a bulk or solution process the monomer mixture and optionally rubber is polymerized in at least two continuous stirred tank reactors. The first reaction temperature is kept at a relatively low temperature from about 100 to 130° C., preferably from 120 to 130° C. and then at a relatively higher temperature from about 130 to 160° C., preferably from about 135 to 145° C. In the polymerization process there are competing initiation reactions. The initiation may be thermal without the use of any additional initiator or may be initiated by the peroxy carbonate initiator. The residence time in each temperature zone is controlled so that the amount of polymerization initiated thermally (which results in a linear polymer) and by the peroxy carbonate initiator (in which about half of the resulting polymer is branched) is controlled so that not more than 50 weight % of the resulting polymer is branched. For example if the reaction is controlled so that the ratio of residence time at the lower temperature to time at higher temperature is from 1:1 to 3:1, preferably from 1.5:1 to 2.5:1, most preferably about 2:1 (i.e. 1.8:1 to 2.2:1). The weight ratio of linear to star branched polymer is controlled greater than 1:1 (e.g. greater than 50:50). Preferably, the vinyl aromatic polymer or styrenic polymer will comprise from about 10 to about 50, preferably from about 10 to about 50 or from about 15 to about 40 weight %, and most preferably from about 15 to about 30 weight % of a star branched polymer.

In a suspension process the monomers, optionally including dissolved rubber, may be either first partially polymerized in a continuously stirred tank system. The partially polymerized monomer mixture has stabilizers or suspending agents added to it to help suspend it in the aqueous phase as an oil-in-water suspension. Typically the stabilizer or suspending agent is added in an amount from 0.1 to 2.0 weight %, preferably from 0.5 to 1.0 weight %.

Useful stabilizers, soaps, or suspending agents are well known to those skilled in the art. Useful stabilizers or suspending agents include polyvinyl alcohol, gelatin, polyethylene glycol, hydroxyethyl cellulose, carboxymethyl cellulose, polyvinyl pyrrolidone, polyacrylamides, salts of poly (meth) acrylic acid, salts of phosphonic acids, salts of phosphoric acid and salts of complexing agents such as ethylene diamine tetraacetic acid (EDTA). Useful soaps include sodium N-dodecyl benzene sulfonate.

Generally the salts are ammonium, alkali and alkaline earth metal salts of the foregoing stabilizers or suspending agents. For example tricalcium phosphate is a suitable suspending agent.

The tetra functional initiator may be added to the monomer mixture prior to polymerization in the bulk or mass reactor or just prior to suspension batch polymerization in the suspension batch reactor. The suspension batch reactor is generally operated at lower temperatures than the bulk reactor, i.e. typically 70 to 95° C. However, the suspension batch reaction is finished at higher temperatures from about 120 to 150° C., typically from about 125 to 135° C.

The resulting polymer has a number of unique properties that make it suitable for extrusion foaming. The polymer has a VICAT softening temperature (as measured by DIN 53460 is equivalent to ISO 306 is equivalent to ASTM D 1525–96) of greater than 100° C., preferably from 105° C. to 115° C. The polymer has mean melt strength at 210° C. of not less than 12.5 cN.

The melt strength and the stretch ratio test are determined using a Rosand® C.apillary Rheometer. The mean melt strength is determined by extrusion of a melt at 210° C. of the polymer through a circular 2-mm diameter flat die, where the length to diameter (L/D) of the die is 20:1. The strand is extruded at a constant shear rate of 20 $sec^{-1}$. The strand is attached to a haul off unit that increases in speed with time. The strand is attached to a digital balance scale to measure the force of draw on the polymer. As the speed of the haul off unit increases, the draw force increases. As a result the strand breaks. The draw force immediately prior to break is defined as the melt strength. The stretch ratio is defined as the ratio of the velocity of draw to the extrusion velocity at the die exit. The test is repeated at least three times to determine an average value.

The polymer may have a melt flow at condition G (200° C./5 kg) load of less than 5 grams/10 minutes, preferably less than 3 grams/10 minutes, most preferably of less than 2 grams/10 minutes. Additionally, the polymer has a Mz which exceeds typical high heat crystal polystyrene resins by at least 40,000, preferably by greater than 60,000.

The polymer may be foamed using conventional extrusion foaming equipment. The extruder may be a back to back type or it may be a multizoned extruder having at least a first or primary zone to melt the polymer and inject blowing agent and a second extruder or zone.

In the primary extruder or zone the polymer melt is maintained at temperatures from about 425° F. to 450° F. (about 218 to 232° C.). Once the polymer is melted, blowing agent is injected into the melt at the end of the primary extruder or zone. In the primary extruder or zone there will be a high shear zone to promote thorough mixing of the blowing agent with the polymer melt. Such a zone may comprise a number of pin mixers.

The polymer melt containing dissolved or dispersed blowing agent is then fed from the primary extruder to the secondary extruder or passes from a primary zone to a secondary zone within the extruder maintained at a melt temperature of 269° F. to 290° F. (about 132° C. to 143° C.). In the secondary extruder or zone the polymer melt and entrained blowing agent passes through the extruder barrel by the action of an auger screw having deep flights and exerting low shear upon the polymer melt. The polymer melt is cooled by means of cooling fluid, typically oil which circulates around the barrel of the extruder. Generally the melt is cooled to a temperature of from about 250° F. to about 290° F. (about 121° C. to 143° C.).

The blowing agent may be selected from the group consisting of $C_{4-6}$ alkanes, CFCs, HFCs, HCFCs, $CO_2$, $N_2$, air and mixtures thereof. The blowing agent may be $CO_2$ per se or $N_2$ per se. The blowing agent may comprise from 20 to 95 weight % of a blowing agent selected from the group consisting of one or more $C_{4-6}$ alkanes (as described below) and from 80 to 5 weight % of CFCs, HFCs and HCFC's (as described below). Suitable $C_{4-6}$ alkanes include butane, pentane and mixtures thereof.

The blowing agent may comprise from 30 to 95, preferably from 70 to 95, most preferably from 80 to 90 weight % of $CO_2$ and from 70 to 5, preferably from 30 to 5, most preferably from 20 to 10 weight % of one or more compounds selected from the group consisting of $C_{1-2}$ halogenated alkanes and $C_{4-6}$ alkanes. Suitable $C_{1-2}$ halogenated alkanes include the chloroflurocarbons (CFCs); hydrofluorocarbons (HFCs) and the hydrochlorofluorocarbons (HCFCS) such as trichlorofluoromethane (CFC-11); dichlorodifluoromethane (CFC-12); trichlorotrifluoroethane (CFC-113); dichlorotetrafluoroethane (CFC-114); dichlorofluoromethane (CFC-21); chlorodifluoromethane (HCFC-22); difluoromethane (HFC-32); 2-chloro-1,1,1,2-tetrafluoroethane (HCFC-124); pentafluoroethane (HFC-125); 1,1,1,2-tetrafluoroethane (HCFC-124); 1,1-dichloro-1-fluoroethane (HCFC-141b); 1-chloro-11-difluoroethane (HCFC-142b); trifluoroethane (HFC-143a); 1,1- difluoroethane (HFC-152a); tetrafluoroethane (HFC-134a); and dichloromethane. However, due to environmental concerns it is preferred to use alkanes such as $C_{4-6}$ alkanes which have not been halogenated such as butane, pentane, isopentane and hexane. The blowing agent system may be used in amounts from 2 to 15, preferably from 2 to 10, most preferably from about 3 to 8 weight % based on the weight of the polymer.

The pressure within the extruder should be sufficient to keep the blowing agent in the polymer melt. Typically, the pressures in the melt after the blowing system has been injected will be from about 1500 to 3500 psi, preferably from about 2000 to about 2500 for $CO_2$. The $CO_2$ and the other blowing agent may be injected separately into the melt. If this is done, preferably the alkane and/or halogenated alkane will be injected upstream of the $CO_2$ as these types of blowing agents have a plasticizing effect on the polymer melt that may help the $CO_2$ go into the melt. The alkane blowing agent and the $CO_2$ may also be mixed prior to injection into the extruder as is disclosed in U.S. Pat. No. 4,424,287 that issued on Jan. 3, 1984 and that is assigned to Mobil Oil Corporation.

To improve the cell size and/or distribution throughout the polymer small amounts of a nucleating agent may be incorporated into the polymer blend or solution. These agents may be physical agents such as talc or they may be agents that release small amounts of $CO_2$ such as citric acid and alkali or alkaline earth metal salts thereof and alkali or alkaline earth metal carbonates or bicarbonates. Such agents may be used in amounts from about 500 to 5,000 ppm, typically from about 500 to 2,500 ppm based on the polymer melt or blend.

The polymer melt or blend may also contain the conventional additives such as heat and light stabilizers (e.g. hindered phenols and phosphite or phosphonite stabilizers) typically in amounts of less than about 2 weight % based on the polymer blend or solution; typically from 200 to 2,000 parts per million (ppm).

The foam is generally extruded at atmospheric pressure and as a result of the pressure decrease, the melt foams. The foam is cooled to ambient temperature typically below about 25° C., which is below the glass transition temperature of the polymer and the foam is stabilized. One of the advantages of the present invention is that the foamed polymer melt has better melt strength than the foamed polymer melts of the prior art and there is less foam collapse and ruptured cells (open cell structure).

The foam may be extruded onto rollers as a relatively thick slab typically from about 1 to 3 inches thick. The foam density may vary from 2 to 15 lbs/ft³ (from about 0.03 to 0.24 grams/cm³). The slab is cut into appropriate lengths (8 feet) and is generally used in the construction industry. Thinner foams, typically from about 1/16 to about 1/4 inches (62 to 250 mils) thick may be extruded as slabs or as thin walled tubes which are expanded and oriented over an expanding tubular mandrel to produce a foam tube which is slit to produce sheet. These relatively thin sheets are aged, typically 3 or 4 days and then may be thermoformed into items, such as coffee cups, meat trays or "clam shells".

The present invention will now be illustrated by the following non-limiting examples in which, unless otherwise indicated parts means parts by weight (grams) and percent means weight percent.

Examples 1 through 4 pertain to extrusion foam.

EXAMPLE 1

Polymer Preparation

Styrene monomer and 0.028 weight % of a tetra t-alkylperoxy carbonate sold by Ato Fina under the trade mark JWEB50 were first fed into a continuously stirred tank reactor maintained at 120° C. The residence time in the first reactor was about 2.5 hours. The partially polymerized mixture from the first reactor was then fed to a second continuously stirred tank reactor maintained at 140° C. The residence time in the second reactor was about 1 hour. The resulting polymer was then devolatilized in a falling strand devolatilizer and recovered and pelletized.

The reaction conditions were such that about 64% of the polymer was thermally initiated and linear. About 36% of the polymer was initiated by the peroxide and about half of the resulting polymer was star branched. The polymer had a Mz from 40,000 to 75,000 greater than conventional high heat crystal.

EXAMPLE 2

The procedure of Example 1 was repeated except that the amount of initiator was 0.045 weight %.

EXAMPLE 3

The procedure of Example 1 was repeated except that zinc stearate was also included in the polymer in an amount of about 0.1 weight %.

Physical Properties

The physical properties of the resins prepared in Examples 1, 2 and 3 were compared to commercially available linear polystyrene resins A, B, and C used in extruded foam applications. The results are set forth in Table 1.

EXAMPLE 4

The above samples together with the reference samples were extrusion foams using pentane as the blowing agent. The average cell diameter of the foam was measured. The results are set out in Table 2.

The foams extruded well and the cell data suggests that the foam stability is good. The resulting foams have good toughness.

TABLE 1

| Polystyrene Sample Identification | Example 1 | Example 2 | Example 3 | Resin A | Resin B | Resin C |
|---|---|---|---|---|---|---|
| Initiator: polyether tetrakis (t-butylperoxy carbonate) | 280 ppm Initiator | 450 ppm Initiator | 280 ppm Initiator + Zn | | | |
| Mw | 351,000 | 345,000 | 342,000 | 306,000 | 309,000 | 310,000 |
| Mn | 132,000 | 113,000 | 141,000 | 77,000 | 102,000 | 130,000 |
| Mz | 638,000 | 659,000 | 606,000 | 535,000 | 551,000 | 550,000 |
| Polydispersity (Mw/Mn) | 2.66 | 3.05 | 2.42 | 3.97 | 3.03 | 2.38 |
| Mean Melt Strength (cN) @ 190° C. | 38.21 | 36.95 | 37.44 | 31.07 | 30.42 | 34.7 |

TABLE 1-continued

| Polystyrene Sample Identification | Example 1 | Example 2 | Example 3 | Resin A | Resin B | Resin C |
|---|---|---|---|---|---|---|
| Mean Stretch Ratio (%) @ 190° C. | 91.8 | 81 | 79.9 | 84.3 | 99.4 | 91.8 |
| Mean Peak Melt Strength @ 190° C. | 45.25 | 45.73 | 43.7 | 38.74 | 34.75 | 39.73 |
| Mean Melt Strength (cN) @ 210° C. | 14.11 | 14 | 14.56 | 10.25 | 11.02 | 11.95 |
| Mean Stretch Ratio (%) @ 210° C. | 279.6 | 230.3 | 236.5 | 428.6 | 399.4 | 326 |
| Mean Peak Melt Strength @ 210° C. | 17.43 | 17.02 | 17.73 | 12.22 | 12.87 | 14.43 |
| Notched Izod (ft-lb/in) | 0.36 | 0.32 | 0.34 | 0.33 | 0.32 | 0.22 |
| Melt Flow Condition "G" (grams/10 min) | 1.35 | 1.74 | 1.4 | 1.98 | 2.07 | 1.42 |
| VICAT (° C.) | 108.4 | 109 | 108.9 | 108.2 | 108.6 | 109.9 |

TABLE 2

| Polystyrene Sample Identification | Example 1 | Example 2 | Example 3 | Resin A | Resin B | Resin C |
|---|---|---|---|---|---|---|
| Initiator: polyether tetrakis (t-butylperoxy carbonate) | 280 ppm Initiator | 450 ppm Initiator | 280 ppm Initiator + Zn | | | |
| Isopentane fed to foam process (wt %) | 5 | 5 | 5 | 5 | 5 | 5 |
| Test Results on 2S Type Foamed Meat Trays Molded From Polystyrene Samples | | | | | | |
| Mean Load at Max Load (lbs) | 2.44 | 2.56 | 2.84 | 3.2 | 2.88 | 2.96 |
| Mean Displacement at Max Load (in.) | 2.16 | 1.92 | 1.46 | 1.71 | 2.13 | 2.28 |
| Mean Load at 1.5" Deflection lbs | 2.2 | 2.44 | 2.82 | 3.16 | 2.67 | 2.62 |
| Mean Slope (lbs/in) | 3.02 | 3.86 | 3.58 | 3.74 | 3.61 | 3.47 |
| Mean Part Weight (grams) | 4.521 | 4.595 | 4.59 | 4.96 | 4.758 | 4.93 |
| Mean Sidewall Thickness (inches) | 0.091 | 0.087 | 0.105 | 0.102 | 0.103 | 0.098 |
| Mean Foam Density (lbs/ft$^3$) | 3.2 | 3.56 | 2.92 | 3.07 | 3.02 | 3.194 |
| Mean Orientation MD (%) | 55.93 | 57.48 | 56.07 | 54.4 | 56.68 | 54.49 |
| Mean Orientation TD (%) | 57.15 | 57.2 | 56.55 | 54.73 | 56.47 | 52.29 |
| Number of Cells Across Sheet Thickness (TD) | 21 | 20 | 38 | 22 | 31 | 23 |
| Average Cell Diameter(mm) | 0.1101 | 0.1105 | 0.0702 | 0.1178 | 0.0844 | 0.1082 |
| Number of Parts With Sidewall Cracks | 0 | 1 | 0 | 3 | 0 | 2 |
| Cell Structure | | coarse | fine | coarse | | coarse |
| Cell Shape | slight elongation | slight elongation | spherical | spherical | spherical | spherical |
| Corner Inversion Test on Trays - Failure Rate/20 | 0 | 3 | 0 | 2 | 0 | 6 |

Oriented Articles

The styrenic polymer composition of the invention may be used in the preparation of oriented articles, e.g. blown film and extruded sheet that are oriented uniaxially or biaxially. In this instance, the above teachings and/or components of the polymer composition for the extrusion foams will apply for the polymer composition used in oriented articles of the invention except that blowing agents and nucleating agents are not required in the polymer composition for oriented blown film and oriented extruded sheet.

For the manufacture of an oriented extruded sheet, the polymer resin granules are fed into an extruder where the resin is heated to a molten state having a polymer melt temperature ranging between 200° C. and 250° C., preferably about 230° C., and then extruded through a sheet T- die and onto a roll stack. The roll stack is operated such that the temperature of the material is above its Tg (glass transition temperature). The roll stack imparts a high degree of orientation (>100%) in the machine direction (MD). As the sheet comes off the roll stack the sides of the sheet are engaged by a series of clamps that are attached to a continuous chain. The clamps pull the sheet through a "tenter frame" which is a long oven. The oven has several heating zones in which the temperature of the material is maintained above its Tg. As the sheet is carried through the tenter oven, the continuous chain of clamps begins to diverge thereby imparting a high degree of orientation (>100%) in the transverse direction (TD). In order for the temperature of the material to remain above its Tg, the temperature in each heating zone is set above the Tg of the polymer. For polystyrene having a Tg of about 105° C., the temperature in each heating zone will typically be set at about 118° C.

Depending on the final application of the sheet, the amount of orientation imparted in the machine direction (MD) and in the transverse direction (TD) will vary. For many applications, the stretch ratios for MD and TD are usually the same or balanced, e.g. MD=TD=2:1 draw ratio. That is, a cookie tray will typically require a 2:1 draw ratio in both the MD and TD, while an envelope window will require a draw ratio of 7:1 in the MD and TD. However, if a hinge is associated with the part, the sheet may require an unbalanced biaxial orientation in the MD and TD orientation, e.g. MD 2:1 draw ratio while TD=1.3:1 draw ratio. Typically, an oriented polystyrene sheet having a 2:1 draw ratio in both the MD and TD will have shrink tension of about 100 pounds per square inch (psi) as measured according to ASTM D 2838.

This pulling or orientation in the machine direction and transverse direction may be done simultaneously or sequentially. When polystyrene is oriented using the process described above, generally it is done sequentially where the sheet is first pulled in the machine direction and then pulled in the transverse direction.

Other additives can be added to the polymer composition for oriented articles. Further examples of suitable additives are softening agents; plasticizers, such as cumarone-indene resin, a terpene resin, and oils in an amount of about 2 parts by weight or less based on 100 parts by weight of the polymer; pigments; anti-blocking agents; slip agents; lubricants; coloring agents; antioxidants; ultraviolet light absorbers; fillers; anti-static agents; impact modifiers. Pigment can be white or any other color. The white pigment can be produced by the presence of titanium oxide, zinc oxide, magnesium oxide, cadmium oxide, zinc chloride, calcium carbonate, magnesium carbonate, etc., or any combination thereof in the amount of 0.1 to 20% in weight, depending on the white pigment to be used. The colored pigment can be produced by carbon black, phtalocianine blue, Congo red, titanium yellow or any other coloring agent known in the printing industry.

Examples of anti-blocking agents, slip agents or lubricants are silicone oils, liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, and higher fatty amides. The organic anti-blocking agents can be added in amounts that will fluctuate from 0.1 to 2% in weight.

Examples of anti-static agents are glycerine fatty acid, esters, sorbitan fatty acid esters, propylene glycol fatty acid esters, stearyl citrate, pentaerythritol fatty acid esters, polyglycerine fatty acid esters, and polyoxethylene glycerine fatty acid esters. An anti-static agent may range from 0.01 to 2% in weight. Lubricants may range from 0.1 to 2% in weight. A flame retardant will range from 0.01 to 2% in weight; ultra-violet light absorbers will range from 0.1 to 1%; and antioxidants will range from 0.1 to 1% in weight. The above compositions are expressed as percent of the total weight of the polymer blend.

Fillers, such as talc, silica, alumina, calcium carbonate, barium sulfate, metallic powder, glass spheres, and fiberglass, can be incorporated into the polymer composition in order to reduce cost or to add desired properties to the film or sheet. The amount of filler preferably will be less than 10% of the total weight of the polymer composition as long as this amount does not alter the shrinking properties of the film or sheet when temperature is applied thereto.

The polymer composition for the oriented article of the invention, particularly extruded polystyrene sheet, may comprise impact modifiers. Examples of impact modifiers include high impact polystyrene (HIPS), styrene/butadiene block copolymers, styrene/ethylene/butene/styrene, block copolymers, styrenelethylene copolymers. The amount of impact modifier used is typically in the range of 0.5 to 25% of the total weight of polymer.

The oriented film or sheet of the invention can be used in any of the well-known food packaging processes, such as in the preparation of yogurt cups, cake domes, cookie trays, envelope windows, CD jewel box shrink film packaging, trays of all sizes and shapes for general food packaging and vending cups. The food packaging process typically involves the polymer film or sheet having a thickness of a few millimeters (typically between 0.2 mm and 0.6 mm). The extruded oriented film or sheet is fed to one or more heating ovens where its temperature is increased above the glass-transition temperature of resin.

Once the desired temperature is reached, the sheet or film is formed into the desired shape by known processes such as plug assisted thermoforming where a plug pushes the sheet or film into a mold of the desired shape. Air pressure and/or vacuum can also be employed to mold the desired shape. During the orientation processing of the film or sheet, the molecules are aligned in both the MD and TD directions. Molecular alignment has long been known to significantly increase the overall toughness of the resin. Thus, when a formed article or part is made from the extruded oriented film or sheet of the invention, the formed article or part retains the "toughness" characteristic imparted to the film or sheet during the orientation process.

The polymer composition of the oriented polystyrene article preferably has a VICAT softening temperature (as measured by DIN 53460 is equivalent to ISO 306 is equivalent to ASTM D 1525–96) of greater than 100° C., preferably from 100° C. to 115° C., and more preferably from 105° C. to 115° C. Also, the polymer composition has a mean melt strength at 210° C. of not less than 12.5 cN, and a melt flow at condition G of less than 2.5 grams/10 minutes.

Preferably, the polymer composition of the oriented article of the invention is polystyrene. Preferably, the oriented article of the invention has a tensile strength ranging from about 8,000 pounds per square inch (psi) to about 12,000 pounds per square inch in a temperature range of about 20° C. to about 30° C. and a tensile strength ranging from about 9,000 pounds per square inch to about 15,000 pounds per square inch in a temperature range from about –20° C. to about –40° C.

EXAMPLE 5

Example 5 pertains to an oriented polystyrene article. The star branched polystyrene resin (0.0280 weight % initiator) used in the polymer composition of the invention is the same as Example 1 of Table 1 herein. The oriented polystyrene article made from Example 1 of Table 1 is identified herein as "Sample I". For comparative purposes, a commercially available high molecular weight linear polystyrene resin was used for all sample preparations and testing. This linear resin is identified herein as "Resin D". Resin D comprises greater than 99.5% polystyrene with about 0.1% to 0.3% mineral oil. Typical chemical and physical properties for Resin D prior to being subjected to an orientation process are shown in Table 3.

TABLE 3

| | Resin D - Typical Properties (un-oriented) | | | | | |
|---|---|---|---|---|---|---|
| $Mw \times 10^{-3}$ | $Mn \times 10^{-3}$ | $Mz \times 10^{-3}$ | Tensile @ Yield (psi) | Tensile Modulus $\times 10^{-5}$ | % Elongation | MFI @ 200° C. |
| 345 | 133 | 626 | 7,580 | 503 | 2.53 | 1.6 |

Sample Preparation:

Twenty-five compression molded plaques were made from each polymer composition of Sample I and Resin D by using a Pasadena Hydraulic Press Model #SQ 33-C-X-MS-X 24. These plaques were 4.5" wide, 4.5" long and 100 mil thick. The conditions used for making the plaques are listed in Table 4.

TABLE 4

| Sample Weight (grams) | Preheat Time (min.) | Preheat Pressure (psi.) | Mold Temp (° F.) | Compression Time (min.) | Compression Pressure (psi) | Cooling Time (min.) | Cooling Temp. (° F.) |
|---|---|---|---|---|---|---|---|
| 26 | 5 | 100 | 450 | 5 | 30,000 | 5 | 68 |

At least ten compression-molded plaques for both Sample I and Resin D were used as samples.

Orientation Process:

A lab scale film stretcher was used to simulate a commercially biaxial orientation process. This film stretcher, Model No BIX-702 manufactured by Iwamoto of Japan, has two movable draw bars mounted on an electrically driven jack screw and located at right angles to each other. A stationary draw bar is located opposite to each movable draw bar. Each draw bar has pneumatically actuated clips for holding a sample in position upon operation of the stretcher.

The general operation of the film stretcher was as follows. A sample was placed in the middle of the draw bar arrangement and the cover was lowered over the sample. The sample was heated for three minutes to soften the material so that the clamps could properly grasp the material. The clamps were activated to grasp the material. Heating was continued at 120° C. (preheat temperature) for 15 minutes (preheat time). Each sample was oriented using the sequential orientation process where the sample was stretched in the machine direction (MD) first and then stretched in the transverse direction (TD). The final dimension of each sample was 12"×12". The stretching may be done at any selected strain rate but for this Example 5, a strain rate of 540% per minute was used. These parameters used in stretching the samples are shown in Table 5.

TABLE 5

| Initial Sample Size | Final Sample Size | Strain Rate mm/sec. (%/min.) | Presoak Time (min.) | Presoak Temperature ° C. | % Total Strain |
|---|---|---|---|---|---|
| 4.5" × 4.5" | 12" × 12" | 9 mm/sec. 540%/min. | 15 | 120 | 200 |

(Note: % Total Strain = Change in dimension compared to original dimension, i.e. (final dimension - initial dimension)/initial dimension.)

Orientation Measurements:

Molecular orientation is generally measured by taking birefringence measurements on the uniaxially or biaxially oriented film or sheet. However, for this Example 5, an approximate value for the amount of orientation was obtained by measuring the shrinkage of the plaque after it had been exposed to a temperature above its Tg. To do this, three 4"×4" samples were cut from the oriented plaques formed in the film stretcher. Each 4"×4" sample was marked with a pencil such that 9 marks were spaced 1" apart. Each sample was lightly coated with talc and placed on a ¼ inch spacer between two aluminum plates. The samples were then placed in a circulating air oven set at a temperature of 163° C. for 30 minutes. The samples were removed from the oven, air cooled, and the distance between each mark was measured. The linear shrinkage was then calculated for both the machine direction (MD) and the transverse direction (TD). The % linear orientation in the MD and the TD was calculated as follows: % Linear Orientation=((Initial Length-Final Length)/Final Length)×100%); machine direction being the direction in which the sample was pulled first and the transverse direction being the direction in which the sample was pulled second. The results were taken as an average for the samples and are shown in Table 6.

TABLE 6

| Polymer | % Linear Shrinkage - MD | % Linear Shrinkage - TD |
|---|---|---|
| Sample I | 198.0 | 177.0 |
| Resin D | 216.8 | 175.6 |

From the data in Table 6, it can be seen that the samples for both Sample 1 and Resin D have about the same degree of orientation in both the machine and transverse directions.

Tensile Yield:

Testing was done on the biaxially stretched samples according to ASTM D-638–99. These samples were the 12"×12" samples produced in the above Orientation Process. These samples were tested for their tensile properties at 23° C. (room temperature) and at −34° C. (refrigeration temperature). This lower temperature testing was done because of the potential end use application of the polymer composition of Sample I in pastry containers, etc. that are subjected to refrigeration, especially during shipment of the products packaged in the containers made from the polymer composition comprising Sample I. The tensile properties for the samples containing the polymer composition of Sample I and Resin D are listed in Table 7.

TABLE 7

| Polymer | Testing Direction | Testing Temperature °C. | Young's Modulus | Tensile Stress @ Break (psi) | % Strain @ Break | Tensile Energy to Break (in lb/in)* |
|---|---|---|---|---|---|---|
| Sample I | MD | 23 | 214 | 9,570 | 6.93 | 485.00 |
| Resin D | MD | 23 | 230 | 9,040 | 5.93 | 381.32 |
| Sample I | MD | −34 | 230 | 11,960 | 5.83 | 411.26 |
| Resin D | MD | −34 | — | 11,160 | 4.13 | 276.72 |
| Sample I | TD | 23 | 223 | 9,700 | 7.27 | 541.00 |
| Resin D | TD | 23 | 239 | 9,430 | 6.06 | 409.30 |
| Sample I | TD | −34 | 221 | 12,460 | 6.34 | 475.0 |
| Resin D | TD | −34 | 240 | 12,000 | 5.69 | 409.0 |

*Energy to Break = Normalized area under tensile stress-strain curve.

The data shown in Table 7 indicates that the samples containing the polymer composition of Sample I have better tensile toughness characteristics than that comprising the polymer composition of Resin D under both extreme temperatures. On an average, the values for the "Tensile Stress @ Break" are 5% higher for Sample I compared to that of Resin D while the values for the "Tensile Energy to Break" for Sample I on an average are 32% higher compared to that for Resin D.

It has been illustrated that the star-branched nature of Sample I may produce a tougher oriented polystyrene product compared to the linear nature of Resin D.

What is claimed is:

1. A process for producing an oriented polymer article comprising:
    (a) preparing a molten mass of $C_{8-12}$ vinyl aromatic polymer prepared by polymerization in the presence of from 0.01 to 0.1 weight % of a tetra functional peroxide initiator of the formula:

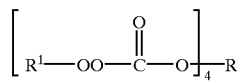

wherein $R^1$ is selected from the group consisting of $C_{4-6}$ t-alkyl radicals and R is a neopentyl group, in the absence of a cross linking agent, and comprised of:
    i) from 60 to 100 weight % of one or more $C_{8-12}$ vinyl aromatic monomers; and
    ii) from 0 to 40 weight % of one or more monomers selected from the group consisting of $C_{1-4}$ alkyl esters of acrylic or methacrylic acid and acrylonitrile and methacrylonitrile; which polymer may be grafted onto or occluded within from 0 to 12 weight % of one or more rubbery polymers selected from the group consisting of:
    iii) co- and homopolymers of $C_{4-5}$ conjugated diolefins; and
    iv) copolymers comprising from 60 to 85 weight % of one or more $C_{4-5}$ conjugated diolefins and from 15 to 40 weight % of a monomer selected from the group consisting of acrylonitrile and methacrylonitrile, said vinyl aromatic polymer comprising about 10 to about 50 weight % of a star branched polymer, and while maintaining the temperature of said vinyl aromatic polymer above its Tg temperature, first forming said vinyl aromatic polymer into said polymer article and then imparting a high degree of orientation to said polymer article in the transverse and machine directions for said producing of said oriented polymer article.

2. The process of claim 1 wherein in step a) said molten mass is prepared by heating said vinyl aromatic polymer to a temperature ranging between about 200° C. and about 250° C., and wherein said oriented polymer article of step b) is an extruded, oriented polystyrene sheet.

3. The process of claim 1 wherein said vinyl aromatic polymer is prepared by solution or bulk polymerization.

4. The process of claim 1 wherein said star branched vinyl aromatic polymer has a VICAT softening temperature not less than 100° C.

5. The process of claim 1 wherein said star branched vinyl aromatic polymer is present in an amount from about 15 to about 50 weight % of the vinyl aromatic polymer.

6. The process of claim 5 wherein the vinyl aromatic polymer has a mean melt strength at 210° C. of not less than 12.5 cN.

7. The process of claim 6 wherein the vinyl aromatic polymer has a VICAT softening temperature from 105 to 115° C.

8. The process of claim 1 wherein the tetrafunctional initiator is selected from the group consisting of tetrakis-(t-amylperoxycarbonyloxymethyl) methane, and tetrakis-(t-butylperoxycarbonyloxymethyl) methane.

9. The process of claim 8 wherein the vinyl aromatic polymer has a melt flow at condition G of less than 2.5 grams/10 minutes.

10. The process of claim 1 wherein the oriented polymer article has a tensile strength ranging from about 8,000 pounds per square inch to about 12,000 pounds per square inch in a temperature range of from about 20° C. to 30° C. and a tensile strength ranging from about 9,000 pounds per square inch to about 15,000 pounds per square inch at a temperature range of about −20° C. to about −40° C.

* * * * *